Patented June 19, 1951

2,557,113

UNITED STATES PATENT OFFICE 2,557,113

CATALYTIC REACTION OF ISOPARAFFIN HYDROCARBONS

Robert M. Kennedy, Drexel Hill, and Abraham Schneider, Philadelphia, Pa., assignors to Sun Oil Company, Philadelphia, Pa., a corporation of New Jersey No Drawing. Application July 10, 1948, Serial No. 38,167

19 Claims. (Cl. 260—683.4)

This invention relates to hydrocarbon reactions promoted under catalytic conditions. More particularly, the invention is directed to a method of effecting various types of hydrocarbon reactions under novel catalytic conditions whereby the reactions take place in homogeneous phase.

The types of reactions coming within the scope of the invention may be characterized as involving the conversion of a non-aryl hydrocarbon charge containing one or more isoparaffin hydrocarbons having a tertiary carbon atom to form one or more different isoparaffin hydrocarbons also containing a tertiary carbon atom.

For instance, the charge may comprise a single isoparaffin containing at least one tertiary carbon atom in the molecule, or a plurality of such isoparaffins, and the reaction will result in the formation of other tertiary carbon-containing isoparaffins. Likewise, the charge may contain one or more of such isoparaffins in admixture with one or more olefins and the reaction will result in the formation of different tertiary-carbon containing isoparaffins. Substantially no normal paraffins are produced under the catalytic conditions employed in accordance with the invention.

Hydrocarbon reactions within the purview of the invention, which may be characterized as above specified, include the following general types (which are more fully described hereinafter): alkylation; self-alkylation; disproportionation; isomerization; and cleavage.

Numerous specific reactions of the aforesaid types have been known heretofore and various catalysts have been proposed for effecting such reactions. The known catalysts, however, generally are of such character that the mixture of catalyst and the hydrocarbon material undergoing reaction is heterogeneous. The catalyst usually is insoluble, or has a limited solubility, in the hydrocarbon charge so that the mixture of reactants and catalyst is composed of a catalyst phase and a hydrocarbon phase. This has necessitated the provision of means for effecting intimate mixing or contact between the catalyst and the hydrocarbons in order to secure sufficient catalytic action to promote the desired reactions. For example, in the alkylation of an isoparaffin with an olefin by means of an acid catalyst such as sulfuric acid or hydrofluoric acid, efficient and expensive agitating means is required in order to obtain the necessary intimate contact between the two liquid phases. Another catalyst which has been widely used in conducting various hydrocarbon reactions of the above mentioned types is aluminum chloride. This material has been used in solid granular form to promote reactions of hydrocarbon liquids as well as hydrocarbon vapors. In either case the operation involves contact between two separate phases, the aluminum chloride on the one hand and the hydrocarbons on the other. While numerous other catalytic materials have been proposed for carrying out reactions of the types herein concerned, it is usually the case that the reaction is brought about through contact between two immiscible phases rather than in homogeneous phase.

The present invention is directed to a method of effecting reactions of the types above specified under novel catalytic conditions such that the reactions take place in homogeneous phase. We have discovered that when boron fluoride and an alkyl fluoride are brought together in the presence of a non-aryl hydrocarbon charge containing one or more isoparaffin hydrocarbons having a tertiary carbon atom, a catalytic condition is thereby established which is effective to cause such isoparaffin to enter into one or more of the aforesaid types of reactions. While as a general rule several of the various reactions will take place, at least to some degree, more or less simultaneously, we have further discovered that by proper selection of operating conditions a given type of reaction can be favored while other types are suppressed. In many cases, by suitable regulation of conditions it is possible to minimize or substantially prevent certain types of the reactions while causing the desired type of reaction to predominate, as more fully discussed hereinafter.

The method according to the present invention thus comprises bringing $BF_3$ and an alkyl fluoride into contact with each other in the presence of the hydrocarbon charge, whereby the tertiary carbon-containing isoparaffin in the charge is caused to undergo one or more of the above specified types of reactions to form one or more different isoparaffin hydrocarbons. Since the $BF_3$ and alkyl fluoride are each soluble in the hydrocarbon charge in the amounts employed to establish the desired catalytic condition, the reaction takes place in homogeneous phase and provision for effecting intimate contact between separate phases is not required.

It is essential in practicing the present method that the $BF_3$ and alkyl fluoride be brought into contact with each other in the presence of the hydrocarbon charge in order to establish the necessary catalytic condition to promote the desired reactions. It is not permissible to pre-mix the $BF_3$ and alkyl fluoride and then add the mixture to the hydrocarbon reactants, for substantially no catalytic effect will result. The proper procedure for inducing the reaction comprises first adding either the BF₃ or the alkyl fluoride to the hydrocarbon charge and then separately introducing the other into the mixture. At the moment of introducing the second-added catalytic component, the desired catalytic condition becomes established and the hydrocarbon reactions take place practically instantaneously; and at the instant of reaction and until the hydrocarbons have undergone substantial reaction, the mass is homogeneous. As the reaction is completed, a dark insoluble layer containing the BF₃ and fluorine from the alkyl fluoride in some sort of complex form separates from the reaction mixture. However, since the insoluble phase does not form until reaction has taken place, the somewhat elaborate and expensive contacting equipment required in other processes may be dispensed with. It is also permissible in the present process to introduce the BF₃ and alkyl fluoride simultaneously but as separate streams into the hydrocarbon reactants, but in such case sufficient agitation should be provided to prevent the two streams from coming in contact with each other before admixing substantially with the hydrocarbon reactants.

The alkyl fluoride employed should have at least two carbon atoms per molecule. It may be a primary fluoride (i. e. one having the fluoride atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with BF₃ to promote catalytic action in accordance with the invention. The temperature at which such catalytic action will be obtained varies, however, with the type of fluoride employed. The activity of the fluorides has been found to increase in the order of primary:secondary:tertiary. Thus, a higher temperature is necessary to obtain the desired catalytic effect with a secondary fluoride than with a tertiary fluoride; and a still higher temperature is required when a primary fluoride is employed. As a general rule the minimum temperatures at which the fluorides in combination with BF₃ will begin to exert substantial catalytic action are approximately as follows:

Tertiary fluorides—minus 120° C.
  Secondary fluorides—minus 90° C.
  Primary fluorides—minus 10° C.

One exception is ethyl fluoride which has been found to be somewhat more inert than the alkyl fluorides having three or more carbon atoms per molecule and which requires a temperature of about +20° C. in order to give rise to substantial catayltic action. Methyl fluoride in combination with BF₃ does not give any substantial catalytic effect at least at temperatures below +150° C. and is not considered within the scope of the present invention.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methyl butane; n-hexyl fluoride; and similar fluoride derivatives of hexanes, heptanes, octanes or the like. As specific illustrations of secondary fluorides, the following may be mentioned: isopropyl fluoride; 2-fluorobutane; 2-fluoro-3-methyl-butane; and 2-fluoro-3,3-dimethyl-butane. A few specific examples of tertiary fluorides are: t-butyl fluoride; t-amyl fluoride; 2-fluoro-2,3-dimethylbutane and other t-hexyl fluorides; t-heptyl fluorides; and 2-fluoro-2,4,4-trimethylpentane and other t-octyl fluorides. It will be understood that the specific compounds named above are given merely by way of illustration and that any alkyl fluoride (with the exception of methyl fluoride) will produce an operative catalytic combination with BF₃ provided the temperature is above the values as set forth above.

A convenient way of visualizing or explaining the mechanism of the reactions which take place in practicing the invention is to employ the concept of carbonium ions; but it is to be understood that the discussion which follows based upon this concept is theoretical and is used merely as an aid in describing the reactions which are believed to occur, and that any theories set forth should not necessarily be considered limitative of the invention.

It appears that the catalytic effect produced by BF₃ and an alkyl fluoride as above specified results from the formation of carbonium ions according to the following equation:

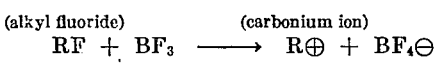

$$\text{(alkyl fluoride)} \qquad \text{(carbonium ion)}$$
$$\text{RF} + \text{BF}_3 \longrightarrow \text{R}\oplus + \text{BF}_4\ominus$$

As shown in the equation, the boron fluoride extracts fluorine atoms from the alkyl fluoride, resulting in the formation of carbonium ions. Where the alkyl fluoride is a primary fluoride, a temperature of at least about −10° C. is required to initiate this reaction. With secondary fluorides the reaction takes place to substantial extent down to temperatures as low as about −90° C., while with tertiary fluorides the reaction begins to occur to substantial extent at temperatures as low as about −120° C.

The above reaction takes place practically instantly when the alkyl fluoride and BF₃ are brought into contact with each other. Formation of the carbonium ions in the presence of the hydrocarbon material which is to be reacted causes the establishment of a catalytic condition which is effective immediately to promote one or more of the types of hydrocarbon reactions above specified, the type of reaction which predominates being dependent upon the particular hydrocarbon reactants present in the mixture and the conditions of operation. It appears that the various types of reactions herein concerned are initiated through an interaction between the carbonium ions formed as above shown and the tertiary carbon-containing isoparaffin in the charge, whereby a hydrogen shift from the tertiary carbon atom to the carbonium ion takes place resulting in the formation of a different carbonium ion corresponding to the isoparaffin. The last-named carbonium ion then will undergo various types of rearrangements or reactions, dependent upon the reaction conditions and the presence or absence of other hydrocarbon reactants, to form a product which in all cases will contain at least one and generally a plurality of tertiary carbon-containing isoparaffins different from the starting isoparaffin. These several steps of reaction resulting in the final product all take place substantially immediately upon commingling the alkyl fluoride and boron fluoride within the hydrocarbon charge.

On the other hand, if the alkyl fluoride and boron fluoride are pre-mixed in the absence of the hydrocarbon charge, the carbonium ions formed will undergo immediate polymerization or other interaction and the catalytic effect will be lost. It is therefore essential in practicing the invention to commingle the catalytic components in the presence of the hydrocarbons to be reacted so that the carbonium ions will be available at the very moment of formation to promote the desired reactions.

In each of the several types of hydrocarbon reactions with which the present invention is concerned (including alkylation, self-alkylation, disproportionation, isomerization and cleavage), it is characteristic that there will be formed, in addition to the hydrocarbon products derived from the starting hydrocarbons, that hydrocarbon which is equivalent to the alkyl fluoride employed. For example, if isopropyl fluoride or normal propyl fluoride is used, propane will be obtained in the product; or if tertiary butyl fluoride is used, isobutane will be present in the product. This results through conversion of the carbonium ions initially formed from the alkyl fluoride into the corresponding hydrocarbon due to hydrogen transfer from the isoparaffin in the charge. Where the alkyl fluoride that is employed itself contains a tertiary carbon atom, the resulting hydrocarbon formed in this manner will be capable of entering into the reaction just as the starting isoparaffins do and consequently will be partly converted to one or more other isoparaffins. Where the alkyl fluoride does not contain a tertiary carbon atom, such further reaction of the hydrocarbon into which the fluoride is converted will not occur.

It is therefore characteristic of the present method that the alkyl fluoride used to promote the reaction is consumed in the operation. However, it is further characteristic that the number of moles of alkyl fluoride consumed is always less than the number of moles of starting hydrocarbons which are caused to react, regardless of the particular type of reaction that predominates. Generally the number of moles of starting hydrocarbons which are converted to other hydrocarbon products in the operation exceeds the number of moles of alkyl fluoride consumed by several fold, but an exception occurs in the case of the self-alkylation of isobutane wherein it appears that a maximum of only two moles of isobutane may be converted per mole of alkyl fluoride consumed. In other cases the amount of conversion per mole of alkyl fluoride consumed is usually considerably in excess of such proportion and in some cases greatly in excess thereof. The effectiveness of the alkyl fluoride, in combination with $BF_3$, to cause substantially more moles of hydrocarbons to undergo reaction than there are moles of alkyl fluoride used may be considered the result of a chain reaction wherein carbonium ions are progressively generated from the hydrocarbons undergoing reaction. As previously explained, the initiating reaction appears to be the interaction of the alkyl fluoride with $BF_3$ to form carbonium ions. These ions then undergo a hydrogen shift with the isoparaffin hydrocarbons present to form other carbonium ions. The latter are capable of entering into various rearrangements and reactions whereby still other carbonium ions may be formed along with hydrocarbon products. The last named carbonium ions will undergo still further reaction, also forming hydrocarbon products and carbonium ions, etc. Reaction will progress until all carbonium ions have been changed into hydrocarbon products. Thus, in this manner a plurality of moles of starting hydrocarbons will be converted for each mole of organic fluoride consumed. It will be understood, of course, that while the mechanism of reaction has been described as stepwise in explanation of the effectiveness of the alkyl fluoride-$BF_3$ combination to promote the hydrocarbon reactions, in actual practice the whole reaction occurs immediately upon commingling the alkyl fluoride and $BF_3$ in the presence of the starting hydrocarbons.

Hydrocarbon conversions which may be carried out by the present process may be classified in three general categories or groups according to the hydrocarbon materials being treated. According to this classification, the hydrocarbon materials treated and the types of reactions that may result are as follows:

I. Treatment of a mixture of an isoparaffin containing one or more tertiary carbon atoms and an olefin. In this case, the main reaction desired generally is alkylation. For example, this group includes the alkylation of an isoparaffin such as isobutane, isopentane, isohexanes, etc. with an olefin such as ethylene, propylene, butylenes, amylenes, etc. Reactions other than straight alkylation may occur to a greater or lesser extent along with the desired reaction.

II. Treatment of a single isoparaffin containing one or more tertiary carbon atoms or a mixture of such hydrocarbons which have the same molecular weight. Here, the charge may undergo self-alkylation, isomerization, disproportionation and cleavage, dependent upon the particular isoparaffin or isoparaffins treated and the conditions employed.

III. Treatment of a mixture of isoparaffins each containing one or more tertiary carbon atoms but having different molecular weights. The conversion of this type of charge will involve the inter-disproportionation of the starting hydrocarbons and perhaps also one or more of the types of reactions mentioned under Group II supra.

In the above defined classes of treatment in accordance with the invention, the main factors influencing the types of reactions which occur generally are as follows:

(1) The particular hydrocarbons undergoing treatment.

(2) The temperature employed.

(3) The mode of addition of the catalytic components.

We have found that in many cases the addition of $BF_3$ to a solution of the alkyl fluoride in the starting hydrocarbon will cause a distinctly different result than when the alkyl fluoride is slowly added to a solution of $BF_3$ in the starting hydrocarbon.

(4) In some cases the particular type of alkyl fluoride employed will have a substantial effect on the character of the products obtained.

(5) The amount of alkyl fluoride employed. This factor is of importance in that it presumably affects the concentration of carbonium ions formed in the reaction mixture. On the other hand, the amount of $BF_3$ used does not appear to be particularly important and a very small amount is usually sufficient.

The effects of these factors are more fully described in the discussion which follows, wherein each of the types of treatment above classified are separately considered.

GROUP I

This broadly includes the treatment of any isoparaffin having one or more tertiary carbon atoms per molecule in admixture with any alkene (which term is not herein intended to include ring compounds, i. e. cycloalkenes). With such starting materials, the desired reaction usually will be alkylation of the isoparaffin with the alkene, although it may also be desired to promote reactions other than straight alkylation.

ISOBUTANE AND ETHYLENE

As an example the treatment of a mixture of isobutane and ethylene may be considered. Ethylene is known to be a rather refractory hydrocarbon which generally will not enter into alkylation reactions readily. By employing $BF_3$ and an alkyl fluoride to promote the reaction, we have found that ethylene may readily be caused to alkylate with isobutane. At temperatures above 0° C. (for example, at 20–100° C.), a considerable amount of straight alkylation occurs to form $C_6$ isoparaffins. Also self-alkylation of the isobutane is obtained (i. e. the isobutane reacts with itself through the formation of tertiary butyl carbonium ions) to yield $C_8$ isoparaffins. Also, part of the ethylene may undergo polymerization, the polymer then becoming saturated through some sort of hydrogen transfer reaction. Cleavage of the resulting saturated polymer probably occurs to an extent giving rise to lower boiling products of various molecular weights which also become saturated through hydrogenation reaction. Polymerization of the ethylene in this type of operation may be suppressed by employing a high ratio of isoparaffin to olefin in the starting mixture, just as is done in known alkylation processes.

At temperatures above 0° C., treatment of isobutane and ethylene results in the reactions as above described regardless of the particular alkyl fluoride employed and the mode of addition of the catalytic components. The resulting product is essentially a saturated isoparaffinic gasoline containing substantial proportions of $C_6$ and $C_8$ isoparaffins along with smaller amounts of isoparaffins of different molecular weights. Little if any organic fluorides are present in the final product after separation of the sludge which drops out as the reaction is completed. The mode of addition of the catalytic components does not greatly affect the nature of the product in this case, although it has been found that the amount of high boiling hydrocarbons formed is somewhat less when the alkyl fluoride is slowly added to a solution of $BF_3$ in the starting hydrocarbons than when the $BF_3$ is introduced into a mixture containing the alkyl fluoride, due probably to the formation of less polymeric material.

On the other hand, when the reaction temperature is below 0° C. (for example, at −20° C. to −80° C.), the type of fluoride employed and the mode of addition of the catalytic components may have considerable influence on the nature of the product obtained from isobutane and ethylene. As previously explained, a primary fluoride is too inert at such low temperatures to enter into the initiating reaction with $BF_3$ to form carbonium ions and therefore cannot be used. When a secondary fluoride is employed under these conditions, considerable straight alkylation occurs to form 2,3-dimethylbutane as essentially the only $C_6$ hydrocarbon. Likewise considerable self-alkylation of the isobutane takes place to form $C_8$ isoparaffins. The latter reaction is favored when the alkyl fluoride is slowly introduced into a solution of $BF_3$ in the hydrocarbon reactants. It is doubtful that any substantial amount of polymerization of the ethylene occurs at these low temperatures, but it appears that some polymerization of isobutylene, which apparently is formed as an intermediate in the reaction takes place. Cleavage and hydrogenation reactions are suppressed at low temperature, with the result that the polymer formed remains as an unsaturated product. No substantial amount of organic fluoride is present in the product when a secondary fluoride is employed to initiate the reaction.

When a tertiary fluoride is used at low temperature, a product of considerably different character may result. Employing the mode of addition wherein $BF_3$ is introduced into the other constituents, a considerable amount of neohexyl fluoride is obtained as a product of the reaction. There is also formed some 2,3-dimethylbutane resulting from straight alkylation of the isobutane with the ethylene as well as some $C_8$ isoparaffins resulting from self-alkylation of the isobutane. Also some isobutylene polymer may be formed from the isobutylene which evidently occurs as an intermediate in the reaction. However, when the tertiary alkyl fluoride is introduced into a solution of $BF_3$ in the hydrocarbon reactants, there is a tendency to suppress the formation of neohexyl fluoride. Very slow addition of the tertiary alkyl fluoride may cause mainly straight alkylation and self-alkylation to occur, with little if any neohexyl fluoride being formed. Faster addition of the alkyl fluoride will result in the formation of substantial amounts of neohexyl fluoride along with the hydrocarbons formed by alkylation reactions. The composition of the final product is dependent to considerable extent upon the amount of alkyl fluoride employed. This is due, as previously stated, to the fact that the extent of initial production of carbonium ions is related to the amount of alkyl fluoride used. When the concentration of carbonium ions is in excess of that required to promote the alkylation or other reactions which the starting hydrocarbons first enter into, the products formed from such reactions will be caused to enter into further reactions such as isomerization and disproportionation. The proportions of specific hydrocarbons in the final product will thus depend to a substantial extent upon the amount of alkyl fluoride used. The proportion of $BF_3$ used, on the other hand, does not appear to affect the nature of the product appreciably.

The following examples illustrate the treatment of mixtures of isobutane and ethylene according to the invention:

Example 1

Two runs were made at different temperatures (20° C. and 100° C.) using isopropyl fluoride as the alkyl fluoride. In each run the procedure was first to charge the isobutane, ethylene and isopropyl fluoride into a contactor provided with stirrer and then introduce $BF_3$ by bubbling it into the mixture. After introduction of the $BF_3$ a period of contact of about 45–60 minutes was allowed during which the mixture was stirred, but from observation of pressure variations within the contactor it was apparent that the reaction in each case took place immediately upon addition of the $BF_3$. Upon standing the reaction mixture separated into an organic layer and a dark lower layer containing $BF_3$ in a complex form.

The layers were separately withdrawn and the hydrocarbon layer was water washed. It was found that BF₃ and HF could be evolved and recovered from the lower layer by heating. From the hydrocarbon layer components boiling below the C₅ range were removed by evaporation. The product representing C₆ and heavier hydrocarbons was distilled under efficient fractionating conditions and the distillate cuts were subjected to infrared analysis. Results are summarized below:

|  | Run A | Run B |
| --- | --- | --- |
| Reaction temperature °C | 20 | 100 |
| Charge: | | |
| isobutane, g | 221 | 225 |
| ethylene, g | 31 | 48 |
| isopropyl fluoride, g | 21 | 22 |
| BF₃, g | 10 | 10 |
| Composition of C₆+ product, volume per cent: | | |
| C₆ | ¹25 | ²24 |
| C₇ | 8 | 11 |
| C₈ | 19 | 18 |
| C₉ and heavier | 48 | 47 |

¹ Composed of about 99% 2,3-dimethylbutane and 1% 2-methylpentane.
² Composed of about 72% 2,3-dimethylbutane and 28% 2-methylpentane.

All of the cuts were composed essentially of isoparaffins with substantially no normal paraffins, olefins or organic fluorides.

*Example 2*

In this example a tertiary alkyl fluoride was employed, using the technique of slowly adding the alkyl fluoride to a solution of BF₃ in the starting hydrocarbons. A pressure reaction vessel was first charged with 146 g. isobutane, 19 g. ethylene and 6 g. BF₃, and then a solution of 44 g. tertiary butyl fluoride in 58 g. isobutane was slowly introduced into the mixture over a period of 42 minutes. The reaction temperature was about 0° C. Upon completion of the reaction, there was obtained 15 g. of lower layer comprising the BF₃ complex, 70 g. of isoparaffinic product boiling above the C₅ range, 174 g. of a lower boiling condensate and 2.3 liters of uncondensed gas which was 97% saturated. The C₆+ product was distilled and analyzed as in the previous example, with the following results:

|  | Vol. Per Cent of C₆+Product |
| --- | --- |
| C₆ | ¹24.4 |
| C₇ | 9.7 |
| C₈ | ²35.4 |
| C₉ and heavier | 30.5 |

¹ Consisted solely of 2,3-dimethylbutane.
² About 65% of C₈ cut was 2,2,4-trimethylpentane.

This example and the previous example show that the treatment of isobutane-ethylene mixtures under certain conditions will yield a product in which the C₆ fraction consists solely or essentially of 2,3-dimethylbutane, which is a compound of good volatility and high antiknock value particularly suited for manufacture of high quality fuel for spark ignition engines.

*Example 3*

This example shows the effect of using a tertiary fluoride at very low temperature. The same order of addition was used as in the previous example but the temperature in this case was −80° C. A pressure reaction vessel was first charged with 111 g. isobutane, 22 g. ethylene and 4 g. BF₃, and then a solution of 22 g. tertiary butyl fluoride in 25 g. of isobutane was introduced over a period of 15 minutes. 15 g. of a dark brown, viscous lower layer was obtained. Lower boiling components were evaporated from the upper layer and 35 g. of product boiling above the C₅ range was obtained. It was found that about 28% of this product was neohexyl fluoride (1-fluoro-3,3-dimethylbutane) having a boiling point of about 75.7° C. and a refractive index $$\left(\frac{25° \text{ C.}}{D}\right)$$

of 1.3686. This compound interfered with the analysis of hydrocarbons in the C₆–C₈ range, but it was determined that the product contained about 31% isoparaffins in this range including at least 3.9% 2,2,4-trimethylpentane and 9.4% 2,3-dimethylhexane. The higher boiling portions of the product may have contained other fluorides although this was not specifically determined. No appreciable amounts of fluorides boiling within the range of the C₆C₈ hydrocarbons was found other than the neohexyl fluoride.

ISOBUTANE AND ISOBUTYLENE OR PROPYLENE

The use of other olefins for alkylation gives somewhat different results than when ethylene is used. In this respect ethylene exhibits an exceptional behavior. Of the other olefins isobutylene or propylene may be considered as representative and it will be understood that the description of reactions occurring when these reactants are employed is more or less applicable in general to other olefins including both straight chain and branched chain alkenes.

In order to effect alkylation of an isoparaffin such as isobutane and an olefin such as isobutylene or propylene employing the catalytic materials of the present process, the mode of addition should be such as to avoid contact between the olefin and BF₃ in the absence of the isobutane and the alkyl fluoride. This is due to the fact that BF₃ will cause olefins other than ethylene to polymerize so that the olefin will be converted to polymer before the other components can be added. The best procedure is to admix the alkyl fluoride with the hydrocarbon reactants and then contact the mixture with BF₃. The latter may be bubbled into the alkyl fluoride-hydrocarbon mixture or the BF₃ may first be dissolved in isobutane and the solution then admixed with the alkyl fluoride-hydrocarbon mixture. It is desirable that such procedure be used regardless of the reaction temperature employed.

When isobutylene or propylene is employed as the olefin, substantially no organic fluorides are formed even at low temperature. This is distinctly different from the results obtained when ethylene is used. At low temperature both straight alkylation and self-alkylation of the isobutane occur to some extent, but polymerization of the isobutylene or propylene is the type of reaction which tends to predominate even though the above specified mode of addition is employed. This reaction may be suppressed to an extent by using a large ratio of isoparaffin to olefin. At the low temperature hydrogenation and cleavage reactions are suppressed, with the result that considerable high boiling polymer of unsaturated character may be obtained.

The use of temperatures above 0° C. (for example, 20–100° C.) will promote straight alkylation and self-alkylation reactions, and at the same time induce cleavage and isomerization. It will also greatly accelerate hydrogenation reactions, with the results that substantially no olefinic constituents will appear in the final product. The overall effect of higher reaction temperature is to yield saturated products containing more low boiling material comprising a wider variety of isoparaffins with less branching than at low temperature. Substantially no normal paraffins are obtained in any case.

The following examples will serve to illustrate the treatment of isobutane-isobutylene mixtures according to the invention:

Example 4

Two runs were made in which the alkyl fluoride was isopropyl fluoride and the amount used was varied. In each run isobutane, isobutylene and isopropyl fluoride were first charged to a pressure reactor and $BF_3$ was then bubbled into the mixture until the pressure reached 120 lbs./square inch gauge. The resulting $BF_3$ complex layer was separated from the hydrocarbon layer, and lower boiling components were permitted to evaporate from the hydrocarbon layer through a condenser cooled by means of ice. The residue was water washed and then subjected to distillation and analysis. The following data, which include the determined percentages of specific components in the product, summarize the results:

|  | Run A | Run B |
|---|---|---|
| Reaction temperature °C | 30 | 25 |
| Charge: |  |  |
| isobutane, g | 200 | 222 |
| isobutylene, g | 42 | 50 |
| isopropyl fluoride, g | 30 | 11 |
| $BF_3$, g. (approx.) | 12 | 14 |
| Composition of product, vol. percent: |  |  |
| $C_5$: isopentane | 17.5 | 1.0 |
| Total | 17.5 | 1.0 |
| $C_6$: 2-methylpentane | 7.4 | 2.0 |
| 2,3-dimethylbutane | 6.1 | 8.0 |
| Total | 13.5 | 10.0 |
| $C_7$: 2,4-dimethylpentane | 2.6 | 4.4 |
| 2-methylhexane | 3.1 |  |
| 2,2,3-trimethylbutane | 0.2 |  |
| 3-methylhexane | 2.2 |  |
| 2,3-dimethylpentane | 1.6 | 2.3 |
| Total | 9.7 | 6.7 |
| $C_8$: 2,2,4-trimethylpentane | 2.6 | 15.7 |
| 2,4-dimethylhexane | 3.8 | 2.3 |
| 2,5-dimethylhexane | 5.5 | 4.3 |
| 2,2,3-trimethylpentane | 1.0 |  |
| 2,3,4-trimethylpentane |  | 2.8 |
| 2,3,3-trimethylpentane |  | 2.7 |
| 2,3-dimethylhexane | 2.6 | 1.5 |
| Total | 15.5 | 29.3 |
| $C_9$ and heavier | 43.8 | 53.0 |

The difference in results between the two runs is due mainly to the different proportions of isopropyl fluoride used. In run B where a small proportion of isopropyl fluoride was used, the product contained a relatively large percentage of 2,2,4-trimethylpentane which is the expected product of alkylating isobutane with isobutylene. Also, little isopentane was formed. In run A where a larger proportion of isopropyl fluoride was used, the proportion of 2,2,4-trimethylpentane was low, the total amount of $C_8$ hydrocarbons was less, a greater variety and amount of $C_7$ hydrocarbons was obtained and the amount of isopentane was considerably increased. These results can be attributed to disproportionation and isomerization reactions induced by the increased amount of carbonium ions formed under the conditions of run A.

Example 5

A contactor with stirrer was charged with 119 grams of a hydrocarbon mixture containing isobutane and isobutylene in ratio of 4.75 parts to 1. 27 grams of isopropyl fluoride was added and the apparatus and contents were cooled to minus 80° C. Boron trifluoride was pumped in and after one hour the reaction mass was removed and $BF_3$ neutralized still at minus 80° C. There resulted 53 grams of a saturated alkylate along with 12 grams of a viscous unsaturated polymer. Infrared analysis showed at least 40% of the alkylate to be 2,2,4-trimethylpentane. The alkylate had a fluorine content of 0.006 weight per cent.

Example 6

A contactor with stirrer was charged with 171 g. of a hydrocarbon mixture containing isobutane and isobutylene in a ratio of 4.75 to 1 and 31 g. of tertiary butyl fluoride was added. The mixture was reacted at a temperature of 20° C. by bubbling in $BF_3$. Upon adding 2 g. of $BF_3$ a very vigorous reaction took place causing a sudden large increase in pressure. The addition of 4 g. more of $BF_3$ caused no further reaction. 20 g. of lower layer was obtained. 69 g. of material boiling below the $C_6$ range was evaporated from the hydrocarbon layer, leaving 94 g. of $C_6+$ product. This product was saturated and had a refractive index of 1.4047. It was distilled and analyzed with the following results:

|  | Vol. Per Cent of $C_6+$ Product |
|---|---|
| $C_6$ | [1] 9 |
| $C_7$ | 8 |
| $C_8$ | [2] 27 |
| $C_9$ and heavier | 56 |

[1] Composed mainly of 2,3-dimethylbutane.
[2] About 54% of $C_8$ cut was 2,2,4-trimethylpentane.

Example 7

A solution of 7 g. $BF_3$ dissolved in 111 g. of isobutane was charged to a pressure reactor. A mixture of 46 g. isobutane, 33 g. isobutylene and 31 g. tertiary butyl fluoride was then slowly introduced into the reactor over a period of 55 minutes while maintaining the temperature at 0° C. The layers were separated and the hydrocarbon product was evaporated to remove the lower boiling constituents. There was obtained 99 g. of low boiling material, 94 g. of a $C_6+$ hydrocarbon product and 31 g. of lower layer. The $C_6+$ product was distilled and analyzed with results as follows:

|  | Vol. Per Cent of $C_6+$Product |
|---|---|
| $C_6$ | [1] 8 |
| $C_7$ | 9 |
| $C_8$ | [2] 36 |
| $C_9$ and heavier | 47 |

[1] About 84% of $C_6$ cut was 2,3-dimethylbutane.
[2] About 60% of $C_8$ cut was 2,2,4-trimethylpentane.

Example 8

This example was carried out in a manner similar to the previous example but employing a smaller proportion of isobutylene. The reaction was effected by introducing a mixture comprising 62 g. isobutane, 23 g. isobutylene and 39 g.

tertiary butyl fluoride over a period of 45 minutes into a solution of 8 g. BF$_3$ dissolved in 117 g. isobutane. There was recovered 138 g. of lower boiling material, 81 g. of C$_6$+ hydrocarbon product and 15 g. of lower layer. Analysis of the C$_6$+ product gave the following results:

|  | Vol. Per Cent of C$_6$+Product |
|---|---|
| C$_5$ | 3.0 |
| C$_6$ | 8.0 |
| C$_7$ | 7.5 |
| C$_8$ | [1] 41.5 |
| C$_9$ and heavier | 40.0 |

[1] Largely 2,2,4-trimethylpentane.

The following example illustrates the treatment of an isobutane-propylene mixture according to the invention:

*Example 9*

A solution of 7 g. BF$_3$ in 117 g. isobutane was charged to a pressure reactor and a mixture comprising 70 g. isobutane, 25 g. propylene and 41 g. isopropyl fluoride was slowly added thereto over a period of 80 minutes, the temperature being maintained at 0° C. There was obtained 27 g. of lower layer, 140 g. of saturated low boiling material and 77 g. of saturated hydrocarbon product. Analysis of the hydrocarbon product gave the following results:

|  | Vol. Per Cent of Product |
|---|---|
| C$_6$: 2,3-dimethylbutane | 5.4 |
| Total | 5.4 |
| C$_7$: 2,2-dimethylpentane | 1.8 |
| 2,4-dimethylpentane | 5.8 |
| 2,3-dimethylpentane | 5.3 |
| 2-methylhexane | 0.5 |
| Total | 13.4 |
| C$_8$: 2,2,4-trimethylpentane | 17.0 |
| 2,4 dimethylhexane | 3.0 |
| 2,5-dimethylhexane | 5.2 |
| 2,2,3-trimethylpentane | 2.7 |
| 2,3,4-trimethylpentane | 1.1 |
| 2,3,3-trimethylpentane | 2.2 |
| 2,3-dimethylhexane | 0.7 |
| Total | 31.9 |
| C$_9$ and heavier | 49.3 |

It will be noted that the amount of C$_8$ hydrocarbons was considerably in excess of the amount of C$_7$ hydrocarbons, which latter are the products normally expected from the alkylation of isobutane with propylene. This is attributed to the occurrence of self-alkylation of the isobutane to substantial extent and possibly also to polymerization of part of the propylene followed by such reactions as hydrogenation, cleavage and isomerization.

USE OF HIGHER BOILING ISOPARAFFINS

When a higher boiling isoparaffin is treated in admixture with an olefin according to the invention, the reactions which result are of the same general types as occur when isobutane is used as described above. However, there is also a tendency for higher boiling isoparaffins to be disproportionate. For example, when isopentane and an olefin are tretaed, part of the isopentane may disproportionate into isobutane and isohexane, which compounds may also enter into the other types of reactions such as straight alkylation and self-alkylation. This does not occur when the saturate hydrocarbon used is isobutane, since isobutane will not undergo disproportionation. In employing the higher boiling isoparaffins, the disproportionation reaction may be suppressed by conducting the treatment at low temperature.

The following examples of the treatment of mixtures of isopentane and ethylene serve to illustrate the use of an isoparaffin which boils higher than isobutane in the group I type of treatment:

*Example 10*

A pressure reactor was charged with 284 g. isopentane, 32 g. ethylene and 17 g. isopropyl fluoride. Approximately 10 g. BF$_3$ was pumped rapidly into the mixture, while the temperature of the mixture was about 100° C. After completion of the reaction and depentanization of the product, about 50 g. of C$_6$+ product which was slightly unsaturated was obtained. Analysis of the product gave the following results:

|  | Vol. Per Cent of C$_6$+ Product |
|---|---|
| C$_6$ | 6.2 |
| C$_7$ | 13.7 |
| C$_8$ | 3.5 |
| C$_9$ and heavier | 76.6 |

The large proportion of high boiling material is attributed to the presence of considerable C$_{10}$ hydrocarbons which resulted from the self-alkylation of the isopentane.

*Example 11*

A pressure reactor was charged with a solution composed of 70 g. isopentane, 17 g. ethylene and 6 g. BF$_3$. With the temperature at about 0° C., a mixture of 37 g. tertiary butyl fluoride and 66 g. isopentane was introduced into the reactor over a period of 22 minutes. After reaction, about 82 g. of a C$_6$+ hydrocarbon product which was saturated was obtained. Analysis gave the following results:

|  | Vol. Per Cent of C$_6$+ Product |
|---|---|
| C$_6$ | [1] 16.0 |
| C$_7$ | 12.0 |
| C$_8$ | 3.8 |
| C$_9$ and heavier | 68.2 |

[1] About 70% of C$_6$ cut was 2,3-dimethylbutane.

The higher proportion of C$_6$ hydrocarbons, as compared to the previous example, is believed to be due to the use of tertiary butyl fluoride in this case. This caused the formation of tertiary butyl carbonium ions which to an extent alkylated with the ethylene to form C$_6$ isoparaffins (mainly 2,3-dimethylbutane). The presence of a large amount of high boiling hydrocarbons in the product is accounted for in the same manner as in the preceding example.

GROUP II

This group is directed to the treatment of a hydrocarbon charge consisting essentially of a single isoparaffin containing one or more tertiary carbon atoms per molecule, or of a plurality of such isoparaffins which have the same molecular weight such as a mixture of isomers. For purpose of discussion, the treatment of a single hydrocarbon will be considered but it will be understood that the same type of reactions will occur when a mixture of hydrocarbons of the same molecular weight is treated.

The general types of reactions which may occur in this treatment include self-alkylation, isomerization, disproportionation and cleavage. Not only will the starting hydrocarbon enter into one or more of these types of reactions, dependent upon the particular hydrocarbon employed and the reaction conditions, but the hydrocarbon products first formed may also undergo such reactions, resulting in the production of a wide variety of hydrocarbons as product. Where a mixture of isomers is treated, interalkylation reactions between the components may also occur.

At low temperature, self-alkylation of the isoparaffin will be favored while isomerization, disproportionation and cleavage reactions will tend to be suppressed. This is true regardless of the order of addition of the $BF_3$ and organic fluoride. On the other hand, the use of a relatively high reaction temperature (e. g. 20–100° C.) tends to promote isomerization, disproportionation and cleavage, and especially so when the $BF_3$ is introduced into a mixture of the alkyl fluoride and starting hydrocarbon or when a large amount of the alkyl fluoride is used.

ISOBUTANE

Disproportionation, isomerization and cleavage of the starting hydrocarbon do not occur when isobutane is treated with $BF_3$ and an alkyl fluoride. The main reaction is self-alkylation of the isobutane; and where a low reaction temperature is employed so as to suppress disproportionation and cleavage of the alkylate formed, a high proportion of $C_8$ isoparaffin (mainly 2,2,4-trimethylpentane) will result. However, if the reaction temperature is sufficiently high, the alkylate formed will undergo extensive disproportionation and cleavage as well as isomerization, so that the product will contain less $C_8$ hydrocarbons and a lower proportion of 2,2,4-trimethylpentane among the $C_8$s remaining in the product. Slow addition of the alkyl fluoride to a previously prepared solution of $BF_3$ and isobutane will tend to suppress these reactions and favor self-alkylation of the isobutane.

It appears that in the treatment of isobutane, the maximum amount of isobutane which can be converted to other hydrocarbons per mole of alkyl fluoride used is two moles.

The following examples in which the alkyl fluoride was slowly added to the other materials in order to favor self-alkylation, will illustrate the treatment of isobutane:

*Example 12*

Two runs (A and B) were made at about −80° C., in which the alkyl fluorides used were, respectively, isopropyl fluoride and tertiary butyl fluoride. In run A a solution containing 27 g. isopropyl fluoride and 57 g. isobutane was slowly introduced into a solution of 8 g. $BF_3$ in 51 g. isobutane over a period of 1½ hrs. In run B a solution containing 23 g. tertiary butyl fluoride and 36 g. isobutane was added to a solution of 10 g. $BF_3$ in 68 g. isobutane over a period of 35 minutes. In each case the resulting hydrocarbon layer was separated from the lower layer which precipitated, and components boiling below the $C_6$ range were removed from the hydrocarbon layer by evaporation. The resulting $C_6+$ product was distilled and the cuts were analyzed. Results were as follows:

| | Run A | Run B |
|---|---|---|
| Temperature °C | −80 | −80 |
| Alkyl fluoride used | isopropyl | t-butyl |
| Yield of product: | | |
| Lower boiling product, g | 86 | 85 |
| $C_6+$product, g | 28 | 16 |
| Analysis of $C_6+$product, vol. per cent: | | |
| $C_6$ | [1] 9 | [1] 3 |
| $C_7$ | [2] 18 | [2] 3 |
| $C_8$ | [3] 35 | [4] 54 |
| $C_9$ and higher | 38 | 40 |

[1] Composed essentially of 2,3-dimethylbutane.
[2] Composed essentially of 2,3- and 2,4-dimethylpentane.
[3] Contained 55% 2,2,4-trimethylpentane.
[4] Contained 89% 2,2,4-trimethylpentane.

*Example 13*

Two runs (A and B) were made in similar manner as in the preceding example except that a temperature of about 0° C. was used. In run A a solution of 40 g. isopropyl fluoride in 72 g. isobutane was introduced into a solution of 6 g. $BF_3$ in 96 g. isobutane over a period of 39 minutes. In run B a solution of 22 g. tertiary butyl fluoride in 52 g. isobutane was added to a solution of 9 g. $BF_3$ in 68 g. isobutane over a period of 1 hour. Results were as follows:

| | Run A | Run B |
|---|---|---|
| Temperature °C | 0 | 0 |
| Alkyl fluoride used | isopropyl | t-butyl |
| Yield of product: | | |
| Lower boiling product, g | | 95 |
| $C_6+$product, g | 55 | 21 |
| Analysis of $C_6+$product, vol. per cent: | | |
| $C_6$ | [1] 6.5 | [1] 5.4 |
| $C_7$ | [2] 13.2 | [2] 12.1 |
| $C_8$ | [3] 46.7 | [4] 47.9 |
| $C_9$ and heavier | 33.6 | 34.6 |

[1] Composed of about 80% 2,3-dimethylbutane and 20% 2-methylpentane.
[2] Composed of about 70% 2,4-dimethylpentane and 30% 2,3-dimethylpentane.
[3] Contained about 39% 2,2,4-trimethylpentane.
[4] Contained about 59% 2,2,4-trimethylpentane.

*Example 14*

This example illustrates the use of a primary fluoride, namely, neohexyl fluoride (1-fluoro-3,3-dimethylbutane), in treating isobutane. At a temperature of about 25° C., a mixture comprising 46 g. isobutane and 21 g. neohexyl fluoride was slowly introduced into a solution of 8 g. $BF_3$ in 75 g. isobutane. After reaction 11 g. of lower layer and 135 g. of hydrocarbon layer were obtained. Isobutane and lower boiling components were evaporated from the hydrocarbon layer, leaving 33 g. of $C_5+$ product having the following composition:

| | Vol. Per Cent of $C_5+$ Product |
|---|---|
| $C_5$ (isopentane) | 12 |
| $C_6$ | 24 |
| $C_7$ | 3 |
| $C_8$ | 25 |
| $C_9$ and higher | 36 |

ISOPENTANE OR HIGHER BOILING ISOPARAFFINS

When an isoparaffin which is higher boiling than isobutane is treated, considerable disproportionation of the starting isoparaffin may occur. For example, when isopentane is treated, part of it will undergo self-alkylation while another part may initially be converted into isobutane and isohexane through disproportionation. These products will also self-alkylate and inter-alkylate with each other or with isopentane. Where the starting isoparaffin is a still higher boiling one, it may also tend to isomerize or cleave initially and the products of these reactions may undergo self-alkylation or inter-alkylation. The over-all effect of such reactions is to yield a product containing a wider variety of compounds and less of the expected product which would result from direct self-alkylation of the starting isoparaffin than in the case of treatment of isobutane. The self-alkylation reaction may be favored to considerable degree and the other reactions suppressed by using a low reaction temperature. At relatively high temperature, disproportionation takes place to a large extent and a considerable amount of cleavage may also occur especially where the starting hydrocarbon is of high molecular weight. The use of a large amount of alkyl fluoride will cause the products first formed by the various reactions to enter into still further reactions of these types. The order of adding the $BF_3$ and alkyl fluoride to the reaction mixture does not appear to have any great effect on the character of the product obtained by treating an isoparaffin which boils above isobutane either at high temperature or at low temperature.

Where the treatment of a single isoparaffin boiling above isobutane is conducted under such conditions that disproportionation is largely effected, it has been found that the degree of branching of the hydrocarbon products will be largely the same as that of the starting hydrocarbon. For example, where a singly branched isoparaffin is treated, the products will be largely singly branched; where a doubly branched isoparaffin is treated, the product will be largely doubly branched; and where the starting hydrocarbon contains three side chains, the product will contain a substantial proportion of hydrocarbons likewise having three side chains.

In the treatment of isopentane or a higher boiling isoparaffin, the amount of conversion per mole of alkyl fluoride employed is considerably higher than when isobutane is treated and generally is in excess of four moles per mole of alkyl fluoride.

The following examples illustrate the treatment of isoparaffins other than isobutane according to the invention:

Example 15

Isopentane was treated at about 22° C. using isopropyl fluoride as the alkyl fluoride. A solution of 94.5 g. isopentane and 7 g. $BF_3$ was first charged to the reactor and then a mixture of 22 g. isopropyl fluoride in 40 g. isopentane was introduced over a period of 10 minutes. The hydrocarbon product was separated from the lower layer and then distilled, with the following results:

| | |
|---|---|
| Lower layer, g. | 13 |
| Propane, g. | 7 |
| Isobutane, g. | 28 |
| Isopentane recovered, g. | 30.5 |
| $C_6+$ product, g. | 65 |
| Analysis of $C_6+$ product, vol. percent: | |
| $C_6$ | 34 |
| $C_7$ | 17 |
| $C_8$ | 9 |
| $C_9$ | 11 |
| $C_{10}$ and heavier | 29 |

The large yields of isobutane and isohexanes resulted from disproportionation of the isopentane. The propane obtained was apparently derived from isopropyl carbonium ions initially formed upon bringing together $BF_3$ with isopropyl fluoride.

Example 16

In this example isopentane was treated at a low temperature (about −80° C.) in order to promote self-alkylation. A mixture composed of about 23 g. tertiary butyl fluoride and 48 g. isopentane was introduced into a solution of 7 g. $BF_3$ in 88 g. isopentane at about −80° C. Materials boiling below 32° C. were removed from the resulting hydrocarbon layer by distillation, yielding 34.5 g. of higher boiling product. Upon distillation, this product was found to contain about 35% of isopentane dimer boiling in the range 146–149° C. (believed to be mainly 3,3,6-trimethylheptane).

Example 17

A mixture of 83 g. 2,4-dimethylpentane and 10 g. isopropyl fluoride was treated at a temperature of 20–25° C. by introducing 4 g. $BF_3$ into the mixture. There was obtained 9 g. of lower layer, 5 g. of low boiling product and 75 g. of $C_6+$ product. The latter had the following composition:

| | Vol. Per Cent of $C_6+$ Product |
|---|---|
| $C_6$: 2,3-dimethylbutane | 2.4 |
| 2-methylpentane | 3.4 |
| 3-methylpentane | 4.4 |
| Total | 10.2 |
| $C_7$: 2,4-dimethylpentane | 32.3 |
| 2,3-dimethylpentane | 17.3 |
| 2-methylhexane | 2.1 |
| 3-methylhexane | 2.4 |
| Total | 54.1 |
| $C_8$: 2,5-dimethylhexane | 4.0 |
| 2,4-dimethylhexane | 2.4 |
| 2,3-dimethylhexane | 0.6 |
| 2,3,4-trimethylpentane | 0.1 |
| Total | 7.1 |
| $C_9$ and heavier | 28.6 |

Example 18

A mixture of 100 g. 2,2,4-trimethylpentane and 30 g. isopropyl fluoride was treated with $BF_3$ at a temperature of about 25° C. A black lower layer weighing 37 g. was obtained. The hydrocarbon layer was evaporated to remove material boiling below the $C_4$ range and also a part of the $C_4$ material. 16 g. of condensate and 121 g. of isoparaffinic residue were thereby obtained. The residue had the following composition:

| | Vol. Per Cent of Residue |
|---|---|
| $C_4$ | 5.4 |
| $C_5$ | 6.7 |
| $C_6$ | 9.4 |
| $C_7$ | 8.6 |
| $C_8$ | [1] 7.5 |
| $C_9$ and heavier | 62.4 |

[1] $C_8$ fraction contained only about 19% 2,2,4-trimethylpentane.

GROUP III

This group is directed to the treatment of a mixture of isoparaffins having different molecular weights and each containing at least one tertiary carbon atom. The product resulting from the treatment will contain other isoparaffins having molecular weights different from the starting hydrocarbons.

Mixture of Isoparaffins Differing by at Least Two Carbon Atoms

When a mixture of two isoparaffins which have a difference of at least two carbon atoms per molecule is treated with $BF_3$ and an alkyl fluoride, one of the reactions which occurs is disproportionation, resulting in the formation of one or more isoparaffins intermediate of the starting hydrocarbons. For example, when a mixture of isobutane and an isohexane is treated under suitable conditions, isopentane will be formed in substantial quantities. Again, when isobutane and an isooctane is treated, isopentane and isoheptanes will be formed and the isoheptane may further disproportionate with the isobutane yielding isohexanes and additional amounts of isopentane. The isopentane may also disproportionate to an extent with the isooctane or the isoheptane. In addition to such disproportionation reactions the starting hydrocarbons may self-alkylate and interalkylate with each other. Operation at a low temperature will favor the alkylation reactions while the use of a high temperature will promote disproportionation. The order of addition of the catalytic components does not appear to have much effect in this type of treatment.

The following examples will illustrate the treatment of two isoparaffins which differ by at least two carbon atoms per molecule:

Example 19

A solution of 4.5 g. $BF_3$ in 96 g. isobutane and 40 g. 3-methylpentane was charged to a pressure reactor. With the temperature at about 25° C., a solution of 22.4 g. tertiary butyl fluoride in 41.2 g. isobutane was introduced into the mixture over a period of 7 minutes. The resulting hydrocarbon layer was distilled to remove components boiling below the $C_6$ range. Approximately 19 g. isopentane was obtained. 54 g. of $C_6+$ product was obtained as residue. This material was distilled and analyzed, with results as follows.

|  | Vol. Per Cent of $C_6+$ Residue |
|---|---|
| $C_6$ | [1] 46 |
| $C_7$ | 5 |
| $C_8$ and heavier | 49 |

[1] Composed of about 23% 3-methylpentane, 59% 2-methylpentane and 18% 2,3-dimethylbutane.

Example 20

A mixture of 99 g. isobutane, 40 g. 2,3-dimethylbutane and 5 g. $BF_3$ was reacted at a temperature of 26° C. by introducing a solution of 22.5 g. tertiary butyl fluoride and 40.5 g. isobutane over a period of 10 minutes. Distillation of the hydrocarbon layer to remove the lower boiling components yielded about 8 g. isopentane, approximately 63 g. of $C_6+$ residue being obtained. Distillation and analysis of the $C_6+$ product gave the following results:

|  | Vol. Per Cent of $C_6+$ Residue |
|---|---|
| $C_6$ | [1] 63 |
| $C_7$ | 6 |
| $C_8$ and heavier | [2] 31 |

[1] Composed of about 80% 2,3-dimethylbutane, 17% 2-methylpentane and 3% 3-methylpentane.
[2] Contained approximately 50% 2,2,4-trimethylpentane.

Mixture of Isoparaffins Differing by Only One Carbon Atom

When a mixture of isoparaffins differing by only one carbon atom per molecule is treated, generally disproportionation will take place to yield products of both lower and higher molecular weights than the starting hydrocarbons. For example, when a mixture of isopentane and an isohexane is reacted, isobutane will be obtained and isoparaffins of higher molecular weight than isohexane will be produced. Self-alkylation and interalkylation of the starting isoparaffins will also occur. The alkylation reactions may be favored by employing a low temperature while the disproportionation reactions may be favored by operating at relatively high temperature. The order of addition of the catalytic components has little effect on the character of the product.

In the treatment of a mixture of isobutane and isopentane, the behavior may be considered exceptional in that no hydrocarbon of lower molecular weight than isobutane can be formed by disproportionation. In this case the disproportionation reaction is masked evidently due to the fact that the $C_9$ intermediate formed by interaction of the isobutane and isopentane cleaves to yield isobutane and isopentane again instead of other hydrocarbons. Consequently the reactions which mainly occur in treating a mixture of these compounds are self-alkylation and interalkylation (which latter reaction gives a $C_9$ product which is different from, and more stable than, the $C_9$ intermediate of the disproportionation reaction above mentioned). It has been found that isopentane is more reactive than isobutane, so that the predominant reaction which takes place is self-alkylation of the isopentane with interalkylation and self-alkylation of the isobutane occurring to lesser degrees. At high temperature these reactions are suppressed apparently due to cleavage of the alkylate products into the starting materials, resulting in a low degree of conversion. The order of adding the catalytic components does not substantially affect the type of reactions occurring with these starting hydrocarbons.

The following examples illustrate the treatment of isobutane-isopentane mixtures, a relatively low temperature being employed in each case in order to obtain a high degree of conversion:

Example 21

A mixture of 123 g. isobutane, 80 g. isopentane and 28 g. tertiary butyl fluoride was treated at about −78° C. by pumping $BF_3$ into the mixture. About 217 g. of hydrocarbon layer and 16.4 g. of lower layer were obtained. The hydrocarbon layer was distilled to remove isopentane and lower boiling components and there was thereby obtained 33 g. of $C_6+$ residue. This material was distilled and analyzed, with results as follows:

|  | Vol. Per Cent of $C_6+$ Residue |
|---|---|
| $C_6$ | 3 |
| $C_7$ | 0 |
| $C_8$ | 12 |
| $C_9$ | 17 |
| $C_{10}$ and heavier | 68 |

Example 22

A mixture of 122 g. isobutane, 43 g. isopentane and 9 g. $BF_3$ was charged to a pressure reactor and cooled to approximately −78° C. A solution composed of 30.6 g. tertiary butyl fluoride and 42.4 g. isobutane was introduced into the mixture over a period of 6 minutes. There was obtained 216 g. hydrocarbon layer and 21.5 g. of lower layer. Upon distillation of the isopentane and lower boiling components from the hydrocarbon layer, 30 g. of $C_6+$ residue was obtained. Distillation and analysis of this material gave the following results:

|  | Vol. Per Cent of $C_6+$ Residue |
|---|---|
| $C_6$ | 3[1] |
| $C_7$ | 0 |
| $C_8$ | 20[2] |
| $C_9$ | 23[2] |
| $C_{10}$ and heavier | 54[3] |

[1] Composed largely of 2,2,4-trimethylpentane.
[2] Composed largely of trimethylhexanes.
[3] Composed largely of trimethylheptanes.

It will be understood that the foregoing examples are merely illustrative of various specific embodiments of the invention and that the invention is applicable to conducting a vast number of other specific reactions. All of the reactions within the scope of the invention may be characterized as involving the treatment of a non-aryl hydrocarbon charge containing at least one isoparaffin having a tertiary carbon atom. The isoparaffin under the conditions of treatment employed according to the invention will be caused to undergo reaction and conversion to other isoparaffin hydrocarbons also containing a tertiary carbon atom. In order to secure this result, however, it is essential that the charge material be substantially free of aryl or aromatic hydrocarbons, inasmuch as the aryl hydrocarbons have such great affinity for carbonium ions that their presence in substantial amounts will result in little or no conversion of the isoparaffins. While in certain cases it may be permissible to have a small amount of aryl constituents present, the amount should be insufficient to substantially prevent reaction of the isoparaffin material. In referring to a non-aryl charge, it is intended to mean that the amount of aryl constituents, if any, should be sufficiently low as to permit the desired reaction of the isoparaffin to occur.

The catalytic materials employed according to the present invention are also useful for converting naphthene hydrocarbons which contain one or more tertiary carbon atoms into other hydrocarbons and also for effecting the polymerization of olefinic hydrocarbons in the absence of a tertiary carbon-containing saturate hydrocarbon. The polymerization of ethylene is claimed in our co-pending application Serial No. 103,738, filed July 8, 1949.

The present application is a continuation-in-part of our co-pending application, Serial No. 661,355, filed April 11, 1946, now abandoned.

Having described our invention, what we claim and desire to protect by Letters Patent is:

1. Method of conducting instantaneous hydrocarbon reactions in homogeneous phase which comprises reacting a tertiary carbon-containing isoparaffin to form other tertiary carbon-containing isoparaffins in the presence of a catalyst comprising an admixture of $BF_3$ and an alkyl fluoride having at least two carbon atoms per molecule at a temperature sufficient to effect said instantaneous homogeneous phase reactions, said temperature being in the range of from −120° C. to 150° C.

2. Method according to claim 1 wherein the alkyl fluoride is a primary fluoride having at least three carbon atoms and the reaction temperature is above −10° C.

3. Method according to claim 1 wherein the alkyl fluoride is a secondary fluoride and the reaction temperature is above −90° C.

4. Method according to claim 3 wherein the alkyl fluoride is isopropyl fluoride.

5. Method according to claim 1 wherein the alkyl fluoride is a tertiary fluoride and the reaction temperature is above −120° C.

6. Method according to claim 5 wherein the alkyl fluoride is tertiary butyl fluoride.

7. Method according to claim 1 wherein the $BF_3$ is introduced into a mixture of the hydrocarbon charge and the alkyl fluoride.

8. Method according to claim 1 wherein the alkyl fluoride is introduced into a mixture of the hydrocarbon charge and the $BF_3$.

9. Method of conducting instantaneous hydrocarbon reactions in homogeneous phase which comprises reacting a tertiary carbon-containing isoparaffin and an alkene to form other tertiary carbon-containing isoparaffins of higher molecular weight in the presence of a catalyst comprising an admixture of $BF_3$ and an alkyl fluoride having at least two carbon atoms per molecule at a temperature sufficient to effect said instantaneous homogeneous phase reactions, said temperature being in the range of from −120° C. to 150° C.

10. Method according to claim 9 wherein the isoparaffin contains 4–5 carbon atoms per molecule.

11. Method according to claim 9 wherein the alkene contains 2–4 carbon atoms per molecule.

12. Method according to claim 9 wherein the isoparaffin contains 4–5 carbon atoms and the alkene 2–4 carbon atoms per molecule.

13. Method according to claim 9 wherein the alkyl fluoride contains 3–4 carbon atoms per molecule.

14. Method of conducting instantaneous hydrocarbon reactions in homogeneous phase which comprises reacting at least one tertiary carbon-containing isoparaffin in the absence of any substantial amount of another tertiary carbon-containing isoparaffin of different molecular weight to form other tertiary carbon-containing isoparaffins in the presence of a catalyst comprising an admixture of $BF_3$ and an alkyl fluoride having at least two carbon atoms per molecule at a temperature sufficient to effect said instantaneous homogeneous phase reactions, said temperature being in the range of from −120° C. to 150° C.

15. Method according to claim 14 wherein the said charge is composed essentially of a single isoparaffin.

16. Method according to claim 14 wherein said charge is composed of a mixture of isomeric isoparaffins.

17. Method according to claim 14 wherein the alkyl fluoride contains 3–4 carbon atoms per molecule.

18. Method of conducting instantaneous hydrocarbon reactions in homogeneous phase which comprises reacting a tertiary carbon-containing isoparaffin and another tertiary carbon-containing isoparaffin of different molecular weight to form tertiary carbon-containing isoparaffins of molecular weight different from said starting isoparaffins in the presence of a catalyst comprising an admixture of $BF_3$ and an alkyl fluoride having at least two carbon atoms per molecule at a temperature sufficient to effect said instantaneous homogeneous phase reactions, said temperature being in the range of from −120° C. to 150° C.

19. Method according to claim 18 wherein the alkyl fluoride contains 3–4 carbon atoms per molecule.

ROBERT M. KENNEDY.
ABRAHAM SCHNEIDER.

REFERENCES CITED

The following references are of record in the file of this patent:

UNITED STATES PATENTS

| Number | Name | Date |
|---|---|---|
| 2,304,290 | Van Peski | Dec. 8, 1942 |
| 2,413,384 | Schmerling | Dec. 31, 1946 |